Aug. 30, 1966   H. S. RUEKBERG   3,270,116
DEBURRING METHOD AND APPARATUS
Filed April 30, 1963   4 Sheets-Sheet 1

INVENTOR
Herbert S. Ruekberg

BY
Mason, Porter, Diller & Stewart
ATTORNEYS

INVENTOR
Herbert S. Ruekberg

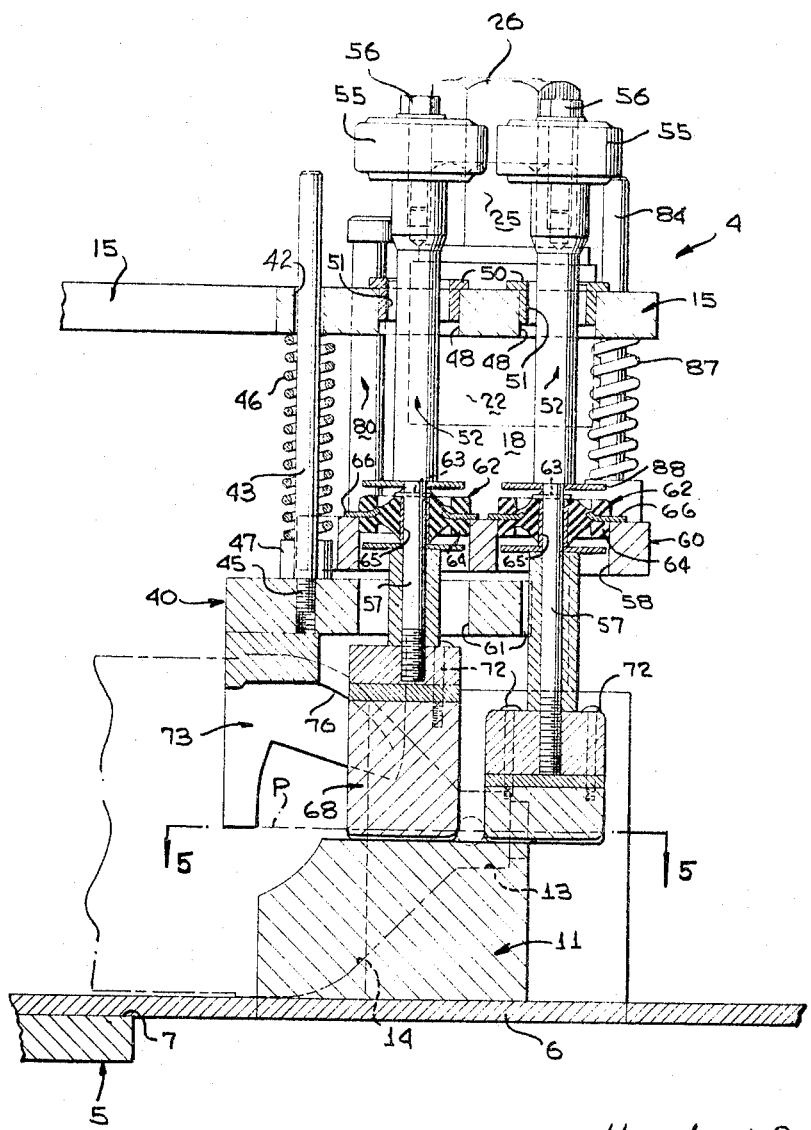

Aug. 30, 1966    H. S. RUEKBERG    3,270,116
DEBURRING METHOD AND APPARATUS
Filed April 30, 1963    4 Sheets-Sheet 4
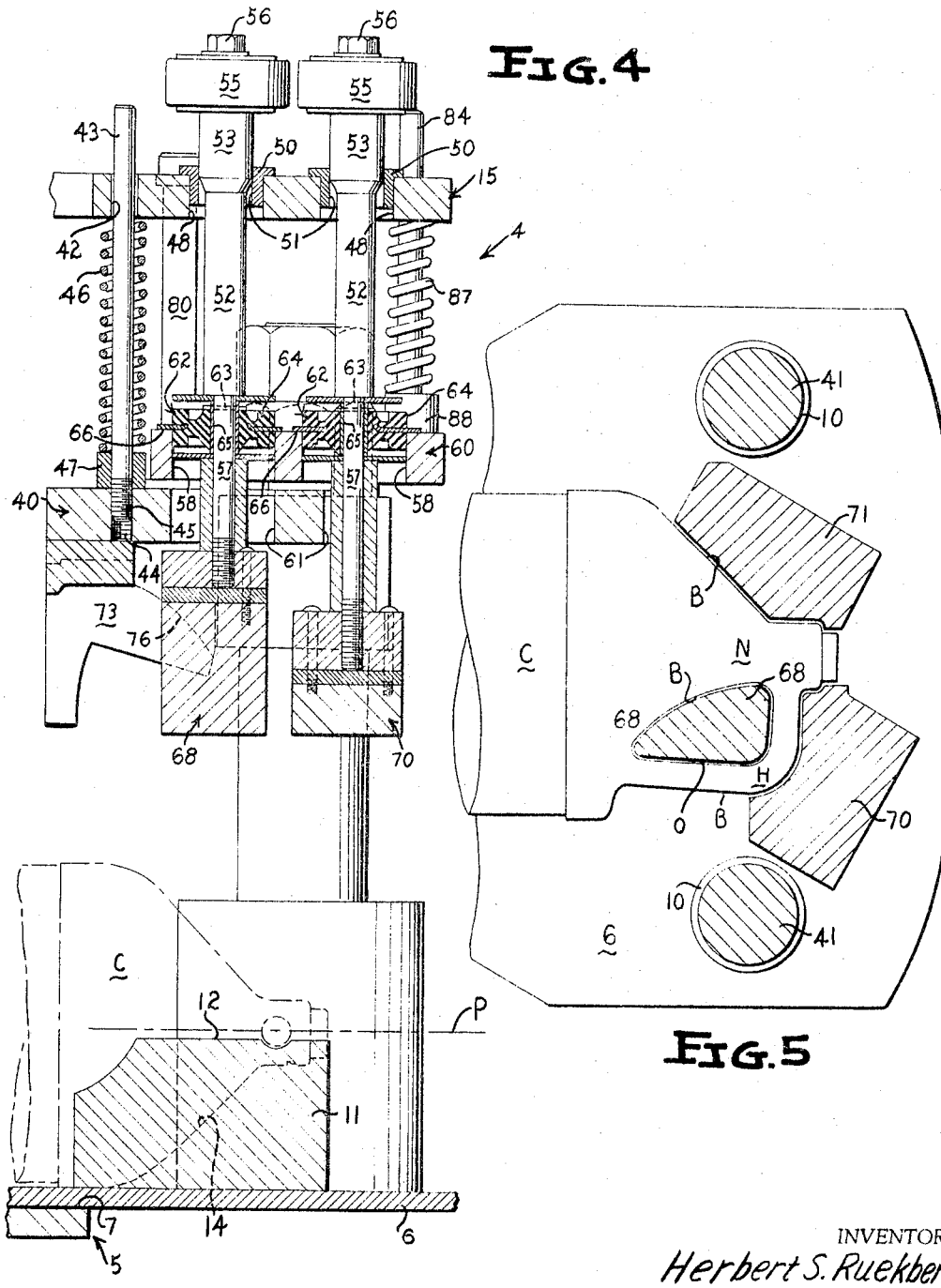
INVENTOR
Herbert S. Ruekberg
BY
Mason, Porter, Diller & Stewart
ATTORNEYS

United States Patent Office 3,270,116
Patented August 30, 1966

3,270,116
DEBURRING METHOD AND APPARATUS
Herbert S. Ruekberg, Highland Park, Ill., assignor to Continental Can Company, Inc., New York, N.Y., a corporation of New York
Filed Apr. 30, 1963, Ser. No. 276,850
20 Claims. (Cl. 264—69)

This invention relates to a novel mechanism for removing burrs or flash from a molded plastic article after it has been removed from a mold.

More particularly this invention relates to a deburring mechanism having a plurality of vibrating heated anvils contoured to the general configuration of a molded plastic article. These anvils contact the burr on the plastic article adjacent the surface of the plastic article, and by a vibratory action the burr material is flattened against and fused to the surface of the molded plastic article.

One method of molding plastic articles that is used extensively to manufacture plastic containers such as bottles and other hollow objects is carried out by enclosing a hot section of tubular plastic in a conventional split-mold of a blow molding machine. A cavity in each half of the split-mold is concavely contoured to the semi-cylindrical configuration of the desired plastic article. A plane through the parting surfaces of the halves of the split-mold generally passes axially through the split-mold and the article formed thereby.

The tubular piece of plastic material is generally formed by extruding, and as the tube emerges from an extruder it is enclosed within the cavity of the split-mold after which the split mold is closed and air under pressure is injected into the split-mold in a known manner to cause the piece of plastic material to conform to the configuration of the split-mold cavity.

There are often portions of the split mold which are actually smaller than the tube of plastic material being enclosed in the mold. For example, in the manufacture of large containers with a narrow neck the finished neck portion of the container may have a smaller diameter than the tube. This is necessary to provide an adequate wall thickness in the body of the container after the hot plastic has been inflated to conform to the contour of the mold. The excess plastic material is pinched off when the mold closes on the neck area, but a thin film extending substantially at right angles to the neck portion of the container remains at the parting line of the mold. The abutting surfaces of the split-mold are usually kept rather narrow in this area and the bulk of the excess material is forced outward from the neck portion of the container but still attached to the container by the thin film adjacent the container. The excess material is known as flash and it is important that it remain attached to the molded article so that it will be removed from the mold as an integral unit. In this way portions of flash material do not become separated from the main body of the plastic article. This is particularly important in continuous blow molding operations where the loose scrap material could seriously affect the smooth operation of the machine.

After the molded plastic article is removed from the split-mold, the flash is generally removed by a cutting, trimming or severing operation. Frequently this flash is torn off by hand. Whether the flash is severed or torn off the plastic article, the surface of the plastic article is rough and burred along the line where the severing, trimming or tearing took place.

Heretofore it has been common procedure to attempt to remove the burr at the parting line by maintaining a closer tolerance on the trimming operation, but this has never been completely satisfactory because the articles or containers emerging from a blow molding line come from a number of molds which, while they are on casual examination identical, actually have some minute differences due to wear, as well as due to inability to build two dies exactly alike. In addition to this variation, containers coming from the same die may vary as the temperature of the extrusion operation fluctuates, the ambient air temperature, as well as other variations caused by differences in the plastic material being extruded. Therefore, the trimming operation, while partially satisfactory, is not capable of producing a smooth fused surface at the parting line. Other attempts to remove the burr by the use of soft abrasives are not satisfactory because of the dust involved. Cutting by hand could be used but this would not be practical on a continuous scale.

There are also instances when the flash of the article may not be trimmed when the plastic tube from which the article is molded is smaller in diameter than the smallest portion of the split-mold or when the article is injection-molded. In such cases the flash nevertheless presents an irregular rough surface projecting outwardly of the surface of the article, and the removal of the flash to form a smooth, integral article surface is highly desirable.

Therefore, it is an object of this invention to provide a novel mechanism for removing this rough line or burr on the surface of a molded plastic article, container or any such other molded product after the same has been trimmed to remove the flash from the exterior surface thereof.

A further object of this invention is the provision of a novel mechanism for uniting burr or flash material of a molded plastic product with the surface of the product by fusing the material of the burr or the flash with the surface of the product to integrally unite the burr or flash material with the product surface, and at the same time improve and strengthen the plastic product at the burr or flash portion of the product.

Another object of this invention is the provision of a novel deburring mechanism particularly adapted for removing the burr remaining on a molded plastic product after the product has been trimmed to remove the flash therefrom, and including a support, a plurality of anvils mounted for reciprocal movement upon the support, each one of the anvils being heated and contoured to the general configuration of trimmed portions of the plastic product, and vibrating means for imparting horizontal motion to each of the anvils whereby the burr is fused or ironed against the surface of the molded plastic product when contacted by the heated vibrating anvils to integrally unite, fuse or flow together the material to the burr and that of the container surface to produce a smooth, integral surface.

A further object of this invention is to provide a novel deburring mechanism of the character above-described, and in addition, to locate the deburring mechanism adjacent and in overlying relationship to an indexing turret upon which a plurality of trimmed, molded, plastic products are carried into underlying registry with the anvils, and means are provided for reciprocating the anvils into alignment with a plane through the burr of the molded, plastic product.

Still another object of this invention is the provision of a novel deburring mechanism of the type immediately above-mentioned wherein the plurality of anvils are each contoured to the general profile of the trimmed portions of the plastic product, the profile dimensions of each anvil being slightly less than the profile dimensions of each respective trimmed portion of the plastic product to enable the vibrating anvils to iron the burr against the surface of the molded product and yet simultaneously prevent an excessive application of heat to the surface of the molded plastic product.

Another object of this invention is to provide a novel deburring mechanism located adjacent an indexing turret upon which is carried a plurality of molded plastic containers with the flash thereof removed including a plurality of heated anvils reciprocally mounted in overlying relationship to the indexing turret, each of the anvils being contoured to the general profile of the trimmed portions of a plastic container, a vibrator operatively associated with each of the anvils for imparting arcuate motion substantially perpendicular to the trimmed portions of the plastic container, the indexing turret including a jig for supporting the plastic containers and assuring alignment of the same with the reciprocating anvils and a stop mechanism for insuring a proper reciprocation of the anvils with respect to the jig carried by the indexing turret.

A further object of this invention is the provision of a novel deburring mechanism of the type immediately above-described wherein the deburring mechanism includes reciprocal holddown means contoured to the configuration of the molded plastic containers for maintaining a plastic container motionless and aligned during the vibration of the plurality of heated anvils.

Still another object of this invention is the provision of a novel method of finishing a molded plastic product having burrs or flash projecting from a surface thereof by vibrating the contoured heated member in a plane normal to the surface of the plastic product and against the burrs projecting therefrom whereby the burrs or flash are fused or ironed against and integrally united with the surface of the plastic product.

With the above, and other objects in view that will hereinafter appear, the nature of the invention will be more clearly understood by reference to the following detailed description, the appended claims and the several views illustrated in the accompanying drawings.

In the drawings:

FIGURE 3 is a fragmentary vertical sectional view taken along line 3—3 of FIGURE 1, and more clearly illustrates various compoents of the deburring mechanism when the anvils of the deburring mechanism are fully reciprocated into a plane through the burr of the molded plastic container.

FIGURE 4 is a fragmentary vertical sectional view of the deburring mechanism of FIGURES 1 through 3, and illustrates the various components of the deburring mechanism prior to the reciprocation of the anvils to the position illustrated in FIGURE 3.

FIGURE 5 is a fragmentary view taken along line 5—5 of FIGURE 3, and illustrates the position of each of the three contoured anvils prior to being vibrated to iron or fuse the burr or flash of the molded plastic container.

Figure 1:
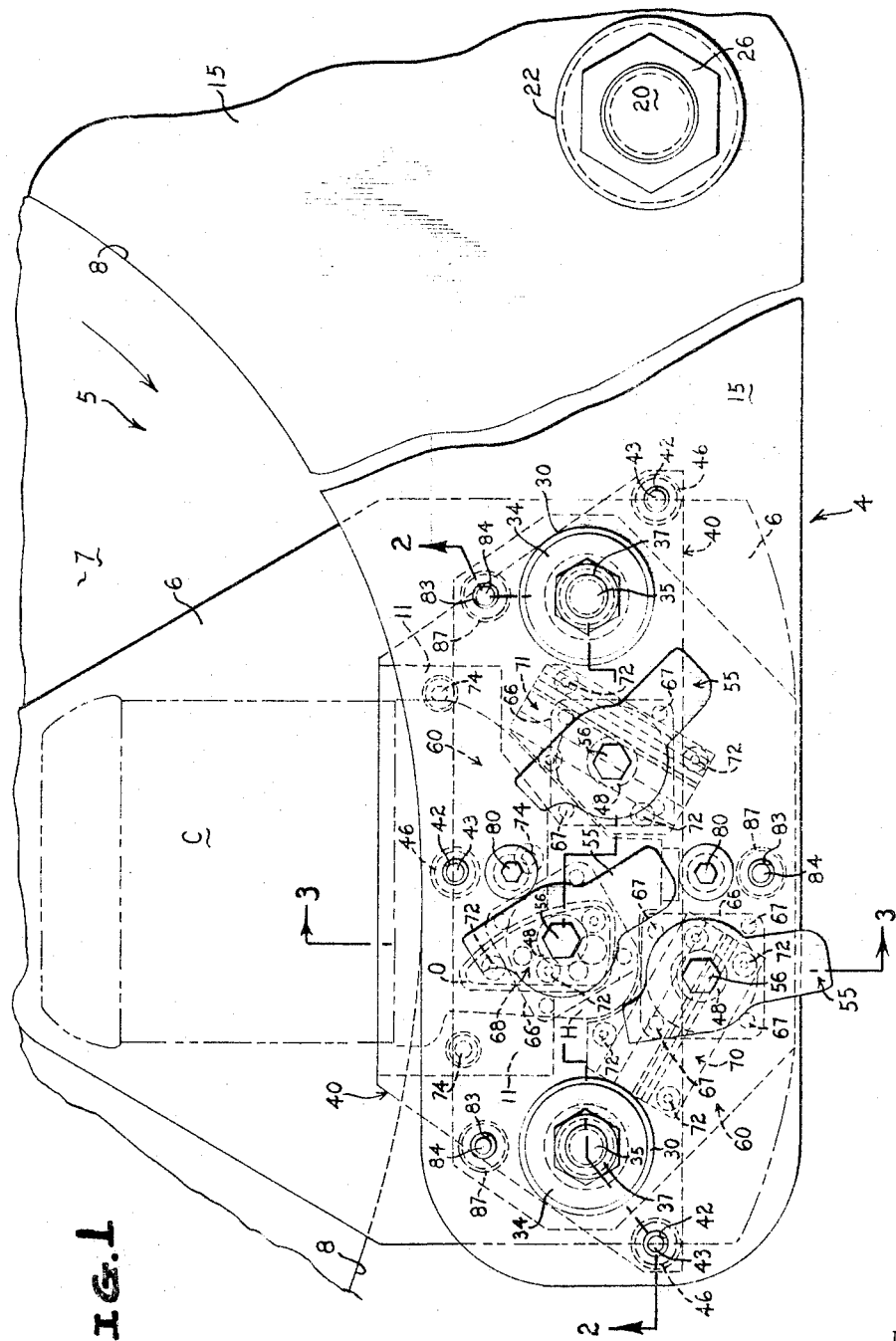
FIGURE 1 is a fragmentary top plane view of a deburring mechanism constructed in accordance with this invention, and illustrates the deburring mechanism adjacent and in overlying relationship to an indexing turret upon which a molded plastic container with the flash removed therefrom is supported and in registration with three contoured anvils.

Referring to the drawings in detail, a deburring mechanism 4 is located adjacent and in overlying relationship to an indexing turret 5 upon which a molded plastic container C is supported in registry with the deburring mechanism 4. The indexing turret 5 is of a conventional construction and is rotated in the direction of the arrow in FIGURE 1 by a suitable mechanism (not shown). A plate 6 is secured to a top surface 7 of the indexing turret 5 by welding or any other suitable securing means. The plate 6 is one of a plurality of plates circumferentially spaced about and secured to the upper surface 7 of the turntable or indexing turret 5.

Each of the plates 6 projects beyond a peripheral edge 8 of the indexing turret or turntable 5. A pair of identical, cylindrical, upstanding stop members 10 (see FIGURE 2) are secured to the plate 6 in spaced relation to each other. The purpose of the stop members 10 will be fully described hereafter.

Figure 2:
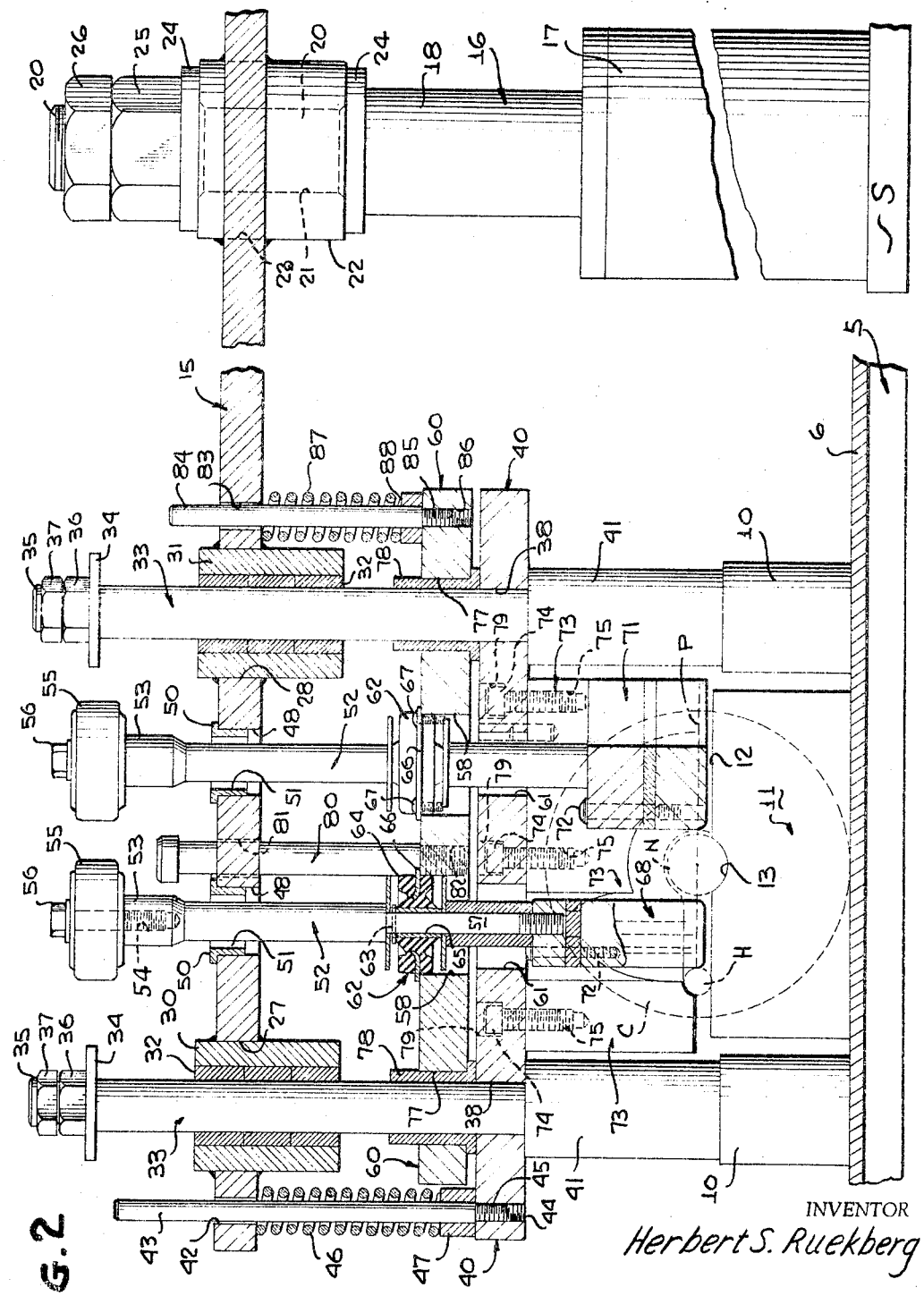
FIGURE 2 is a vertical jump sectional view taken along line 2—2 of FIGURE 1, and illustrates the molded plastic container immovably positioned between a portion of the indexing turret and the deburring mechanism when the anvils of the deburring mechanism are fully reciprocated into a plane through the burr of the molded plastic container.

A jig 11 is secured to the plate 6 between the stop members 10 but displaced radially inwardly toward the axis of the indexing turret 5 from a plane through the axes of the stop members 10. An upper surface 12 of the jig 11 is spaced slightly below and parallel to a plane P (FIGURE 2) of the burr projecting outwardly from the surface of the molded plastic container C. The jig 11 has an arcuate slot 13 in the upper surface 12 thereof contoured to a neck N of the container C, as is best illustrated in FIGURE 2 of the drawings. The slot 13 of the jig 11 tapers radially inwardly and downwardly at 14 in conformity with the contour of the container C as shown in FIGURES 3 and 4 of the drawings.

The deburring mechanism 4 comprises a reciprocal plate 15 in vertical overlying spaced relationship to the plate 6 of the indexing turret 5. The reciprocal plate 15 is supported above the plate 6 of the indexing turret 5 by means of a hydraulic cylinder 16. Additional hydraulic cylinders identical to the hydraulic cylinder 16 may be suitably employed to additionally support the reciprocal plate 15. As is clearly illustrated in FIGURE 2 of the drawings, the hydraulic cylinder 16 is supported on a supporting surface S, which for example may be a table top or a floor in the area in which the deburring mechanism is located. The hydraulic cylinder 16 includes an outer tubular member 17 and an inner reciprocal piston 18. A reduced end portion 20 of the piston 18 is passed through a bore 21 of a collar 22 welded in an aperture 23 of the reciprocal plate 15. An identical washer 24 on each side of the collar 22, a nut 25 and a lock nut 26 secure the reduced end portion 20 of the piston 18 in the collar 22 in a manner clearly illustrated in FIGURE 2 of the drawings. Thus, as fluid is introduced into the outer cylinder 17 of the hydraulic cylinder 16, the piston 18 is moved upwardly in FIGURE 2 in the usual manner, while the removal of the hydraulic fluid causes downward movement of the piston 18 in the same figure. These reciprocal movements of the piston 18 are, of course, imparted to the reciprocal plate 15.

The reciprocal plate 15 is provided with two circular openings 27 and 28 (see FIGURE 2) in which a respective cylindrical journal 30 and 31 is secured. An identical, cylindrical, anti-friction bearing 32 is press-fit in each of the cylindrical journals 30 and 31. A vertical cylindrical guide rod 33 is slidably received in each of the bushings or bearings 32. An identical washer 34 is secured to a reduced threaded end portion 35 of each of the guide rods 33 by an identical nut 36 and a lock nut 37. Each of the guide rods 33 passes through an identical aperture 38 of a reciprocal stop plate 40. The portions of each of the guide rods 33 passing through the apertures 38 of the reciprocal stop plate 40 are secured thereto by welding. An integral, depending, cylindrical portion 41 of each of the guide rods 33 is in axial alignment with the stop members 10 of the plate 6. The integral cylindrical portions 41 of the guide rods 33 thus form stop members which cooperate with the stop members 10 of the plate 6 to limit the vertical descent of the reciprocal stop plate 40 in a manner to be hereafter discussed.

Three guide bores 42 are formed in the reciprocal plate 15 (see FIGURES 1, 2 and 3), and each of the guide bores 42 slidably receives therein a cylindrical guide rod 43. Each of the guide rods 43 is secured in a threaded bore 44 of the reciprocal stop plate 40 by a threaded end portion 45. A compression spring 46 encompasses each of the guide rods 43 between the reciprocal plate 15 and an annular spring seat 47 of the reciprocal stop plate 40.

In the lowermost position of the piston 18 of FIGURE 2, the reciprocal plate 15 bears against each of the three compression springs 46 causing intimate but yielding contact between the cylindrical portions or stop members 41 of the reciprocal stop plate 40 and the stop members 10 of the plate 6.

Three identical openings 48 (see FIGURE 1) are formed in the reciprocal plate 15, and an identical flanged collar 50 (FIGURES 2–4) having a bore 51 is press-fit in each of the openings 48. An identical vertical shaft 52 of a circular transverse section is received in the bore 51 of each of the flanged collars 50. An enlarged upper end portion 53 of each of the shafts 52 has an axial threaded bore 54. An identical vibrator 55 is secured to the enlarged portion 53 of the shaft 52 by a threaded bolt 56, received in the axial threaded bore 54 of the shaft 52. Each of the vibrators 55 is connected to a suitable source of compressed air (not shown).

An integral end portion 57 of each of the shafts 52 passes through a bore 58 in a reciprocal mounting plate 60 and also passes through relief openings 61 in the reciprocal stop plate 40.

An identical vibration mounting 62 surrounds each end portion 57 of the shafts 52 and is secured thereto by means of a traverse pin 63. As is best illustrated in FIGURES 2, 3 and 4 of the drawings, each of the vibration mountings 62 includes a substantially circular elastic body 64 bonded to a sleeve 65 through which the transverse pin 63 passes. A substantially square, metallic plate 66 is bonded to the elastic body 64 of the vibration mounting 62. Four identical screws 67 in each of the plates 66 secure the same and the vibration mounting 62 to the reciprocal mounting plate 60 in the manner clearly shown in FIGURE 2 of the drawings. The elastic bodies 64 of the vibration mountings 62 serve as elastic pivots through which the vibrating motion of the vibrator 55 is transmitted to three anvils 68, 70 and 71.

The anvils 68, 70 and 71 are each secured to a respective one of the end portions 57 of the shafts 52. Each of the anvils 68, 70 and 71 is contoured to the general profile of a trimmed portion of the molded plastic container C and the profile dimensions of the anvils 68, 70 and 71 are slightly less than the profile dimensions of the trimmed portions of the plastic container C. This is best illustrated in FIGURE 5 of the drawings wherein the anvils 68, 70 and 71 conform to the general configuration of portions of the container C. The anvil 68 conforms to the general configuration of an opening O between a handle H and the neck N of the plastic container C. The anvils 70 and 71 similarly conform to burred portions of the respective handle H and neck N of the container C. However, it should be noted that the transverse cross-sectional area or profile dimensions of the anvil 68, as well as the anvils 70 and 71, is less than the profile dimension of the container C and the anvils 68, 70 and 71 are not in contact with any burred portion B of the plastic container C when the vibrators 55 are inoperative. While the profile dimensions of the anvil 68 are slightly less than the opening O, the profile dimensions of the anvils 70 and 71 can be substantially identical to or greater than the outside dimensions of the container C.

The anvils 68, 70 and 71 are also formed from a plurality of metallic bodies secured together by a plurality of screws 72. Each of the anvils 68, 70 and 71 is of a different configuration and each is vibrated by a vibrator 55. The construction of the anvils 68, 70 and 71 from a plurality of metallic bodies secured together prevents erratic motion and undesirable vibration of the dissimilarly contoured anvils 68, 70 and 71.

As is clearly illustrated in FIGURES 2, 3 and 4 of the drawings, each of the anvils 68, 70 and 71 depends below the plane P of the burr of the container C and terminates short of the upper surface 12 of the jig 11. Thus, the jig 11 presents no interference to the vibration of the anvils 68, 70 and 71.

Each of the anvils 68, 70 and 71 is heated by means (not shown) to a temperature in excess of the melting point of the particular thermoplastic material of the container C. It should be particularly noted that the heated anvils 68, 70 and 71 each contact, when vibrated, the burr B projecting from the surface of the plastic container C along a plane normal to the burr plane P at all times. This insures even ironing or fusing of the projecting burr B against the surface of the plastic container C.

A holddown member 73 depends from the reciprocal stop plate 40 and is secured thereto by a plurality of identical threaded bolts 74 passed through apertures 79 in the stop plate 40 (see FIGURE 2) and received in threaded bores 75 of the holddown body 73. The holddown body 73 is concavely contoured at 76 to the general configuration of the plastic container C. The holddown body 73 maintains the plastic container C immovable during the deburring operation.

The anvils 68, 70 and 71 are yieldably guided to the position illustrated in FIGURE 2 by means of the reciprocal mounting plate 60 to which each of the anvils is attached by a respective one of the identical mountings 62. The reciprocal mounting plate 60 includes two identical bores 77 into each of which an identical flanged collar 78 is press-fit. The flanged collars 78 each surround a respective one of the cylindrical guide rods 33 to insure accurate reciprocal motion of the reciprocal mounting plate 60 with respect to the guide rods 33.

A pair of identical stripper bolts 80 (see FIGURE 1) are each passed through an identical bore 81 in the reciprocal plate 15 and are secured to the reciprocal mounting plate 60 by a threaded connection 82. These stripper bolts 80 also insure accurate vertical reciprocation of the reciprocal mounting plate 60 and the anvils 68, 70 and 71 secured thereto.

Three identical bores 83 in the reciprocal plate 15 each slidably receive an identical guide rod 84 therein. Each of the guide rods 84 has a threaded end portion 85 received in a threaded bore 86 of the reciprocal mounting plate 60. A compression spring 87 encompasses each of the guide rods 84 and is seated between the reciprocal plate 15 and an annular spring seat 88 secured to the reciprocal mounting plate 60. The three compression springs 87 yieldably urge the reciprocal mounting plate 60 to its lowermost position, as shown in FIGURES 2 and 3, when the reciprocal plate 15 is moved vertically downwardly in these figures by the piston 18 of the hydraulic cylinder 16.

In the operation of a deburring mechanism constructed in accordance with this invention, a plurality of molded plastic containers, such as the molded plastic container C, are positioned about the circumference of the indexing turret 5 upon the plates 6 thereof within the jigs 11. The turret 5 is then indexed in a manner well known in the art until the molded plastic container C is in registry with the deburring mechanism 4. At this time, the piston 18 is in uppermost position thereof and the reciprocal plate 15 is in the position illustrated in FIGURE 4. As is shown in FIGURE 4 of the drawings, the holddown body 73 is spaced a sufficient distance above the plastic container C to allow the same to be indexed into registry with the overlying deburring mechanism 4.

Hydraulic fluid is then removed from the cylinder 17 in any manner causing the descent of the piston 18 and the reciprocal plate 15 secured thereto from the position shown in FIGURE 4 toward the final position illustrated in FIGURES 2 and 3. The enlarged portions 53 of the shafts 52 engaging the bushings 50 (see FIGURE 4) stabilize the shafts 52 to prevent contact between the anvils 68, 70 and 71 carried thereby with the surface of the container C as the reciprocal plate 15 descends. At this time, a suitable mechanism is actuated to energize the vibrators 55 to impart horizontal motion to the heated anvils 68, 70 and 71 or the vibrators 55 may be energized after the anvils 68, 70 and 71 have reached the position thereof shown in FIGURES 2 and 3.

As the reciprocal plate 15 descends toward the plate 6 of the indexing turret 5, the four compression springs 46 yieldably urge the cylindrical portions or stop members 41 of the reciprocal stop plate 40 into contact with the stop members 10 of the plate 6. The holddown body 73 carried by the reciprocal stop plate 40 is similarly yieldably urged into contact with the plastic container C and thus holds down or clamps the plastic container C between itself and the jig 11 carried by the plate 6.

Continued downward motion of the reciprocal plate 15 compresses the compression springs 87 causing the reciprocal mounting plate 60 and the anvils 68, 70 and 71 carried thereby to be yieldably urged into the position shown in FIGURE 2 of the drawings.

As the heated anvils 68, 70 and 71 are vibrated the arcuate motion imparted thereto by the vibrators 55 causes the anvils to reciprocate in a plane parallel to the plane of the burr B and contact the burrs projecting from the surface of the plastic container C at right angles. The application of heat and motion to the burrs B in the manner discussed causes the burrs to be "ironed" or fused against the surface of the plastic container C. This ironing of the burrs under the application of heat integrally unites the material of the burr and the surface of the plastic container C to present a smooth, integral container surface. In effect the plastic material of the burr and that of the container surface are flowed together during the above-described ironing process.

Hydraulic fluid is then introduced into the cylinder 17 causing upward movement of the piston 18 and subsequent removal of the reciprocal plate 15, along with the components of the deburring mechanism carried thereby, once again to the position of FIGURE 4. The turret 5 may then be indexed once again and the above-mentioned procedure repeated to deburr subsequent molded plastic containers.

While one form of a deburring mechanism has been shown for a purpose of illustration, it is to be clearly understood that various changes in the details of construction and arrangement of parts may be made without departing from the spirit and scope of the invention as defined in the appended claims.

I claim:
1. A mechanism particularly adapted for removing flash material remaining on portions of molded plastic articles comprising a support adapted to be located adjacent a member upon which a plurality of plastic articles are carried whereby the plastic articles may be transported in operative association to said support, a plurality of anvils movably mounted with respect to said support, each one of said plurality of anvils being contoured to the general configuration of flash-carrying portions of the plastic articles, means for heating each of said plurality of anvils and vibrating means for imparting motion to each of said plurality of anvils whereby the flash remaining on a molded plastic article is fused against and integrally united with the surface of the article.

2. A mechanism particularly adapted for removing flash material remaining on portions of molded plastic articles comprising a support adapted to be located adjacent an indexing turret upon which a plurality of molded plastic articles are carried whereby the plastic articles are transportable into registry with said support, a plurality of anvils reciprocally mounted on said support for movement normal to a plane through the flash of a plastic article, means for reciprocating said anvils, each of said plurality of anvils being contoured to the general profile of flash-carrying portions of the plastic article, means heating each of said plurality of anvils and vibrating means for imparting vibrating motion to each of said plurality of anvils parallel to the plane of the flash whereby the flash is fused against and integrally united with the surface of the plastic article.

3. A mechanism particularly adapted for removing flash material remaining on molded plastic articles comprising a support adapted to be located adjacent an indexing turret upon which a plurality of plastic articles having flash portions are carried whereby the plastic articles are transportable into registry with said support, a plurality of anvils reciprocally mounted on said support for movement normal to a plane through the flash of a plastic article, means for reciprocating said anvils, said reciprocating means including a plurality of shafts reciprocally journaled in said support, one anvil of said plurality of anvils being carried by a respective one of said plurality of shafts below said support, each of said plurality of anvils being contoured to the general profile of flash portions of the plastic articles, means heating each of said plurality of anvils and vibrating means for imparting vibrating motion to each of said plurality of anvils parallel to the plane of the flash whereby the flash remaining on a molded plastic article is fused and integrally united with the surface of the plastic article, said vibrating means including a plurality of individual vibrators and one vibrator of each of said plurality of individual vibrators being carried by a respective one of said plurality of shafts above said support.

4. A mechanism particularly adapted for removing flash material from molded plastic articles comprising a support adapted to be located in adjacent overlying relationship to an indexing turret upon which a plurality of plastic articles are carried whereby the plastic articles may be transported in underlying relationship to said support, an anvil reciprocally mounted with respect to said support, said anvil being contoured to the general profile of a flash-carrying portion of the plastic articles, the profile dimensions of said anvil being slightly less than the profile dimensions of the flash-carrying portion of the plastic articles, said anvil being heated and means being provided for imparting vibratory motion to said anvil parallel to the plane of the flash whereby the flash remaining on a molded plastic article is fused to and integrally united with the surface material of the article.

5. A mechanism particularly adapted for removing flash material from molded plastic articles comprising a support adapted to be located in adjacent overlying relationship to an indexing turret upon which a plurality of plastic articles are carried whereby the plastic articles may be transported in underlying relationship to said support, an anvil reciprocally mounted with respect to said support, said anvil being contoured to the general profile of flash-carrying portion of the plastic articles, said anvil being heated and means being provided for imparting vibratory motion to said anvil parallel to the plane of the flash whereby the flash remaining on a molded plastic article is fused to and integrally united with the surface material of the article.

6. A mechanism for finishing a molded plastic product comprising a reciprocal member, said reciprocal member being adjacent the path of travel of a transport mechanism adapted to carry a plurality of molded plastic products therewith, stop means on said transport mechanism, a stop member reciprocally carried by said reciprocal member, said stop member including stop means adapted to contact the stop means of said transport mechanism to limit the reciprocal movement of the stop member with respect to the transport mechanism and at least one additional reciprocal member carried by said first mentioned reciprocal member, said one additional reciprocal member carrying at least one anvil contoured to the general configuration of the molded plastic product, means for heating said anvil and means for vibrating said anvil when said anvil has been reciprocated adjacent a molded plastic product on the transport mechanism.

7. A mechanism for finishing a molded plastic product comprising a reciprocal member, said reciprocal member being adjacent the path of travel of a transparent mechanism adapted to carry a plurality of molded plastic products therewith, stop means on said transport mechanism, a stop member reciprocally carried by said reciprocal member, said stop member including stop means adapted to contact the stop means of said transport mechanism to limit the reciprocal movement of the stop member with respect to the transport mechanism and at least one additional reciprocal member carried by said first mentioned reciprocal member, said one additional reciprocal member carrying a plurality of anvils, each of said anvils being contoured to the general configuration of portions of the molded plastic product, the dimensions of at least one of said anvils being slightly less than the contour dimensions of the associated portions of the product, means for heating said anvils and means for vibrating said anvils when the anvils have been reciprocated adjacent a molded plastic product on the transport mechanism.

8. A mechanism for finishing a molded plastic product comprising a reciprocal member, said reciprocal member overlying the path of travel of a transport mechanism adapted to carry a plurality of molded plastic products therewith, said transport mechanism including a jig contoured to the configuration of a portion of the plastic product, stop means on said transport mechanism, a stop member reciprocally carried by said reciprocal member, said stop member including stop means adapted to contact the stop means on said transport mechanism to limit the reciprocal movement of the stop member with respect to the transport mechanism and at least one additional reciprocal member carried by said first mentioned reciprocal member, said one additional reciprocal member carrying a plurality of anvils, each of said anvils being contoured to the general configuration of portions of the molded plastic product, the dimensions of at least one of said anvils being slightly less than the contour dimensions of the associated portions of the product, means for heating said anvils and means for vibrating said anvils when the anvils have been reciprocated adjacent a molded plastic product on the transport mechanism.

9. A mechanism for finishing a molded plastic product comprising a reciprocal member, said reciprocal member overlying the path of travel of a transport mechanism adapted to carry a plurality of molded plastic products therewith, said transport mechanism including a jig contoured to the configuration of a portion of the plastic product, stop means on said transport mechanism, a stop member reciprocally carried by said reciprocal member, said stop member including stop means adapted to contact the stop means of said transport mechanism to limit the reciprocal movement of the stop member with respect to the transport mechanism, said stop member having holddown means in reciprocal alignment with said jig and at least one additional reciprocal member carried by said first mentioned reciprocal member, said one additional reciprocal member carrying a plurality of anvils, each of said anvils being contoured to the general configuration of portions of the molded plastic product, means for heating said anvils and means for vibrating said anvils when the anvils have been reciprocated adjacent a molded plastic product on the transport mechanism.

10. A mechanism for finishing a molded plastic product comprising a reciprocal member, said reciprocal member overlying the path of travel of a transport mechanism adapted to carry a plurality of molded plastic products therewith, stop means on said transport mechanism, a stop member reciprocally carried by said reciprocal member, said stop member including stop means adapted to contact the stop means of said transport mechanism to limit the reciprocal movement of the stop member with respect to the transport mechanism and at least one additional reciprocal member carried by said first mentioned reciprocal member, said one additional reciprocal member carrying a plurality of anvils, each of said anvils being contoured to the general configuration of portions of the molded plastic product, means for heating said anvils and means for vibrating said anvils when the anvils have been reciprocated adjacent a molded plastic product on the transport mechanism, means for reciprocating said reciprocal member and a plurality of biasing means operatively associated with said reciprocal stop, and one additional member, whereby the stop and said one additional member are yieldably urged toward the transport mechanism by said reciprocating means.

11. A method of finishing a molded plastic article comprising removing the mold parting line burr by contacting the burred surface of the plastic article with a heated anvil contoured to the general configuration of said surface, vibrating the anvil against said surface, heating the burr to a temperature sufficient to soften the plastic material and fusing the burr against the surface of the plastic article.

12. A method of finishing a molded plastic article by removing a molded parting line burr from a surface of the plastic article comprising the steps of providing a heated member and vibrating the heated member in a plane normal to the surface of the article against the parting line burr projecting from the surface of the plastic article whereby the burr is fused against the surface of the plastic article.

13. A method of finishing a molded plastic article by removing a mold parting line burr from a surface of the plastic article comprising the steps of moving a heated member adjacent the parting line burr along a linear path normal to the plane of the burr and moving the heated member in a plane normal to the linear path against the burr projecting from the surface whereby the burr is fused against the surface of the plastic article.

14. A method of finishing a molded plastic article by removing a mold parting line burr therefrom comprising the steps of contacting the burred surface of the plastic article with a heated anvil, and moving the heated anvil against said surface whereby the burr is heated to a temperature sufficient to soften the plastic material and fuse the burr against the surface of the plastic article.

15. A mechanism particularly adapted for removing flash on a molded plastic product comprising a support, a plurality of heated anvils carried by said support, said anvils being contoured to the general profile of portions of the molded plastic product and means for imparting vibratory motion to said anvils whereby the flash on the molded plastic product is fused against and integrally united with the surface of the product.

16. A mechanism particularly adapted for removing flash from portions of a molded plastic product comprising a support, a plurality of heated anvils carried by said support, said anvils being contoured to the general profile of portions of the molded plastic product, the profile dimensions of at least one of the heated anvils being slightly less than the profile dimensions of an associated portion of the molded plastic product and vibrating means for imparting vibratory motion to each of said plurality of anvils.

17. The mechanism as defined in claim 16 wherein the vibratory motion imparted to each of the plurality of anvils is parallel to the plane of the flash whereby the flash is fused against and integrally united with the surface of the molded plastic product.

18. A mechanism particularly adapted for removing flash on a portion of a molded plastic product comprising at least one heated anvil, said anvil being contoured to the general profile of the portion of the molded plastic product, and means for vibrating said heated anvil to impart arcuate motion thereto whereby contact of the anvil with the flash on the portion of the molded plastic product fuses the flash integrally with the surface of the product.

19. The mechanism as defined in claim 18 wherein the profile dimensions of the contoured anvil are slightly less than the profile dimensions of the portion of the molded plastic product.

20. The mechanism as defined in claim 18 wherein the profile dimensions of the contoured anvil are slightly greater than the profile dimensions of the portion of the molded plastic product.

References Cited by the Examiner
UNITED STATES PATENTS

| | | | |
|---|---|---|---|
| 1,163,987 | 12/1915 | Eggers | 264—96 |
| 2,360,950 | 10/1944 | Kilgour | 264—248 |
| 2,717,474 | 9/1955 | Barradell-Smith. | |
| 2,849,347 | 8/1958 | Vziel. | |

ALEXANDER H. BRODMERKEL, *Primary Examiner.*

F. S. WHISENHUNT, *Assistant Examiner.*